June 30, 1964 C. M. MESECKE 3,139,599

INFRARED DETECTOR WITH PN JUNCTIONS IN INDIUM ANTIMONIDE

Filed Dec. 9, 1960 2 Sheets-Sheet 1

INVENTOR
Curtis M. Mesecke

BY
Stevens, Davis, Miller & Mosher
ATTORNEYS

June 30, 1964 C. M. MESECKE 3,139,599

INFRARED DETECTOR WITH PN JUNCTIONS IN INDIUM ANTIMONIDE

Filed Dec. 9, 1960 2 Sheets-Sheet 2

INVENTOR
Curtis M. Mesecke

BY
Stevens, Davis, Miller & Mosher
ATTORNEYS 3,139,599

INFRARED DETECTOR WITH PN JUNCTIONS IN INDIUM ANTIMONIDE

Curtis M. Mesecke, Dallas, Tex., assignor to Texas Instruments Incorporated, Dallas, Tex., a corporation of Delaware Filed Dec. 9, 1960, Ser. No. 74,830
4 Claims. (Cl. 338—18)

The present invention relates to compound semiconductors, and, more particularly, relates to a technique for forming PN junctions in indium antimonide. In a preferred embodiment of the invention the resultant PN junction indium antimonide device is used for detecting infrared radiation.

In the prior art, indium antimonide infrared detector cells have been made by starting with single crystal material of N-type conductivity, and then doping the indium antimonide with a P-type conductivity-producing impurity to form a PN junction in the semiconductor material. Infrared detector cells made in this manner suffer from the disadvantage of requiring an optical filter to prevent the detection of energy at wavelengths in the 1 to 2.5 micron regions. Also, prior art infrared detectors are not able to eliminate noise satisfactorily, resulting in a poor signal to noise ratio.

It is, therefore, an object of the present invention to provide a sensitive infrared detector which has a selective spectral response, thereby eliminating the need for optical filters. This is accomplished because the required filtering action takes place in the infrared cell itself.

It is a further object of the present invention to provide a sensitive infrared detector in which the signal to noise ratio and the scattering effect are improved over prior art detectors.

It is a still further object of the present invention to provide a sensitive indium antiomonide infrared detector having a selective spectral response in which the particular band of frequencies to which the device is to be made sensitive is preselected, and the concentrations of the doping impurities for the indium antimonide are determined according to the desired frequency response.

It is a still further object of the present invention to provide a simple, inexpensive and reliable method for producing infrared detectors having the improved characteristics set forth above.

It is a still further object of the present invention to provide an improved method for forming PN junctions in indium antimonide.

Other and further objects, advantages and characteristic features of the present invention will become readily apparent from the following detailed description of preferred embodiments of the invention when taken in conjunction with the appended drawings, like numerals indicating like parts, in which.

Figures 1, 2, 3, 4:
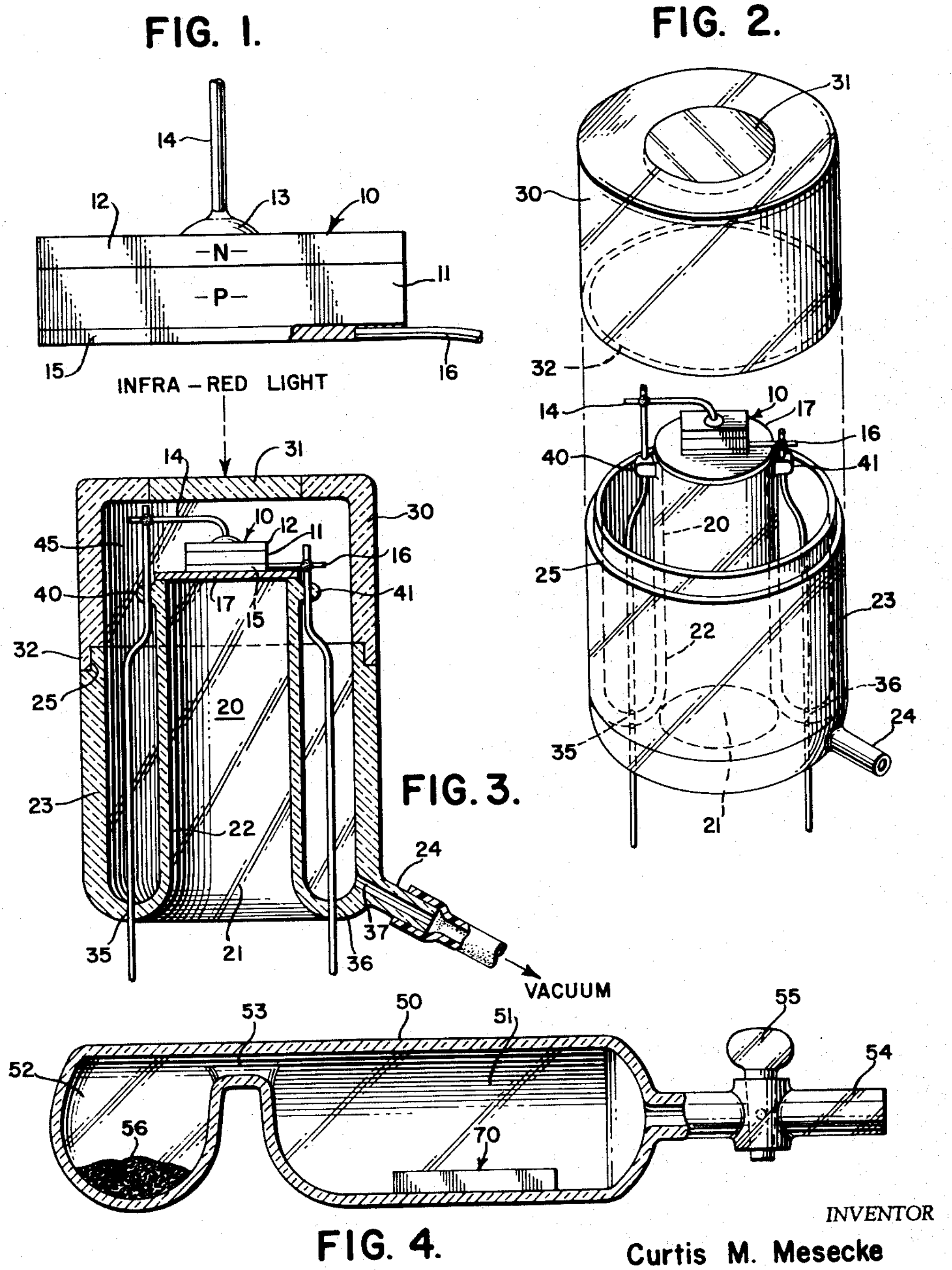
FIGURE 1 illustrates a PN junction indium antimonide semiconductor device produced in accordance with the technique of the present invention.
FIGURE 2 is a perspective view of the semiconductor device of FIGURE 1 shown mounted on one part of a two-part casing prior to vacuum sealing the semiconductor device inside the casing, the encased indium antimonide semiconductor device being used as an infrared detector.
FIGURE 3 is a longitudinal sectional view of the indium antimonide device as sealed in the two-part casing.
FIGURE 4 illustrates schematically the apparatus used in the diffusion process for forming the PN junction.

Referring now to the drawings, FIGURE 1 illustrates the PN junction indium antimonide device which is designated generally by the numeral 10. The device 10 comprises a die of P-type indium antimonide into which an N-type layer 12 has been diffused, leaving a layer 11 of P-type material, with a PN junction disposed between the layers 11 and 12. The diffusant used to form the layer 12 is an alloy of one of the N-type impurities selected from the group consisting of sulfur, selenium, and tellurium alloyed with a carrier including indium and gallium. A contact 13 is alloyed to the N-type layer 12 and contains an N-type impurity such as sulfur, selenium or tellurium in an indium-gallium carrier. The same N-type impurity used to form the diffused layer 12 is used to form the contact 13. A lead wire 14 for the N-type layer 12 is connected to the contact 13. The lead wire 14 is preferably made of an alloy of gold and gallium, of gold, gallium and tantalum, or of pure gold. A tin or indium base plate 15 is alloyed to the P-type layer 11, and a lead 16, preferably of Kovar is connected to the plate 15. Kovar is the trademark for an alloy comprised of about 17 to 18% cobalt, 28 to 29% nickel and the balance iron.

When the indium antimonide PN junction semiconductor device of FIGURE 1 is used as an infrared detector, it is encased in a two-part glass housing, as is shown in FIGURES 2 and 3. The indium antimonide wafer 10 is mounted on a Kovar header 17 attached to cover the end of inner cylindrical wall 22 of a Dewar vacuum flask composed of inner cylindrical wall 22 and an outer cylindrical wall 23. The material of header 17 is selected to make a hermetic glass to metal seal with wall 22 as is well known in the art. The space enclosed within wall 22 constitutes a coolant chamber 21. The walls 22 and 23 are joined by a U-shaped section of glass so that they define a chamber between them open at its upper end only. The lead wires 14 and 16 for the semiconductor device 10 are attached by spot welding or soldering to pins 35 and 36 of Kovar. Insulators 40 and 41 secure pins 35 and 36, respectively, to wall 22. An opening 37 is provided in the wall 23 of the flask and a fitting 24 is formed integrally with wall 23 to facilitate attachment of a hose leading to a suitable vacuum producing means.

The upper part of the glass casing comprises a cylindrical glass shell 30 open at one end and having a sapphire window 31 disposed in its closed end. The open end of the shell 30 is provided with an annular flange 32 which fits against an annular shoulder 25 on the rim of the wall 23. The shell 30 is sealed to the outer wall 23 of the Dewar flask to form a sealed chamber 45 for the indium antimonide device 10. After the two sections of the casing have been sealed together, chamber 45 is purged with an inert gas such as helium or argon, and then evacuated via fitting 24 to a vacuum of about $5 \times 10^{-7}$ mm. of Hg.

During operation of the infrared detector, the chamber 21 of the double walled Dewar flask is filled with a suitable coolant, such as liquid $N_2$, which maintains the device at a temperature of preferably around 77° K. The infrared radiation to be detected passes through the sapphire window 31 and impinges upon the indium antimonide wafer 10. Electric current is generated in the wafer 10 in accordance with the strength of the impinging infrared radiation and passed to the leads 14 and 16. The leads 14 and 16 are connected via pins 35 and 36 to suitable amplifying and measuring circuits not shown.

The process for producing the PN junction indium antimonide semiconductor device 10 according to the principles of the present invention will now be described. The starting material is a wafer cut along the <111> plane from a single crystal of P-type indium antimonide. The P-type conductivity is imparted to the indium antimonide by zone refining in which process one end of a bar of indium antimonide is converted predominantly to P-type conductivity. This material is regrown to be single crystal of P-type conductivity by a method similar to the well known Teal-Little method (described in U.S. Patent No. 2,683,676, granted to J. B. Little and G. K. Teal for producing crystals of germanium). To obtain the desired resistivity, the indium antimonide, if necessary, could be doped with such elements as cadmium, zinc or mercury as well as other P-type conductivity affecting impurities. The precise technique of obtaining P-type conductivity indium antimonide is of little consequence and forms no part of this invention. The thickness of the single crystal is preferably around 30–40 mils, the resistivity preferably being from about .1 to about 25 ohm-cm. The wafer is etched in an etchant of saturated tartaric and nitric acid in the ratio by volume of 3 to 1 although this ratio is not critical. Since the crystal was cut along the 111 plane, the etch will attack one side of the wafer at a faster rate than the other. This is because indium minutely protrudes at one surface of the crystal and antimony at the other. The indium or fast-etching side of the crystal is formed into an N-type layer 12 in the wafer by means of a solid state diffusion operation. The apparatus used to carry out the diffusion is illustrated in FIGURE 4. The apparatus comprises a specially designed "Pyrex" glass diffusion tube 50 having a large chamber 51, a small chamber 52, and a narrow neck portion 53 disposed between the large chamber 51 and the small chamber 52. The end of the chamber 51 remote from the neck 53 is provided with a tube 54 and a valve 55. The valve 55 controls the gas pressure inside the chambers 51 and 52. When carrying out the diffusion operation according to one embodiment of the invention, the chamber is evacuated to a pressure of the order of $2 \times 10^{-6}$ mm. Hg.

The diffusant for producing the N-type diffused layer 12 is an alloy containing either sulfur, selenium or tellurium alloyed with indium and gallium. The gallium is necessary for type conversion as well as to eliminate a surface reaction between the dope and the wafer. Also, the gallium probably in a form of indium-gallium antimonide effects the spectral distribution for both long and short wavelengths, since indium-gallium antimonide has a continuous range of energy gaps from that of gallium antimonide to that of indium antimonide. The purpose of the indium is to make the gallium easier to handle. In a preferred embodiment of the invention the diffusant consists of from about 0.05%–15% gallium, around 15%–55% tellurium, selenium or sulfur, and the remainder indium mixed with approximately 50% InSb. A particular diffusant which has been employed successfully contains 50% tellurium. In FIGURE 4, the diffusant is illustrated as individual alloy pellets 56 located in the small chamber 52 of the diffusion tube 50. As referenced heretofore and hereinafter, percentage of material as given is percent by weight.

In carrying out the diffusion process, the diffusant 56 is placed in the chamber 52, and the wafer oriented to maintain identity of the fast etched or indium side is placed in the chamber 51 of the tube 50. The tube 50 is evacuated to the desired pressure, after which it is put into an oven (not shown) and heated to a temperature of from about 450° C. to about 510° C. The tube 50 is left in the oven for a time varying from 6 to 265 hours, depending upon whether sulfur, selenium or tellurium is used as the N-type conductivity-producing ingredient in the diffusant and also depending upon the bulk resistivity of the indium antimonide. Table I gives typical examples.

*Table I*

| Bulk Resistivity (Ohm-cm.) | Diffusion Time (Hours) | Impurity Alloy, Wt. Percent of Constituents | Diffusion Temperature (° C.) |
|---|---|---|---|
| 18 | 20 | 31% In, 1.9% Ga, 50% Te and 17.1% InSb. | 510 |
| 18 | 40 | 31% In, 1.9% Ga, 50% Te and 17.1% InSb. | 450 |
| 0.1 | 150 | 22.7% In, 1.2% Ga, 27.3% Te and 48.8% InSb. | 500 |
| 0.1 | 150 | 1.5% Ga, 30% Se, 31% In and 37.5% InSb. | 500 |

After the diffusion operation, the wafer (with the N-type layer 12 formed therein) is removed from the diffusion tube 50 and conditioned by removing the N-type layer from the Sb or slow-etched side by lapping. The wafer is this diced by cavitroning, sawing or similar method of area definition by similar means or by a photo-etch process. The dice are then suitably etched to remove damaged surface regions. Next, as illustrated in FIGURE 1, the contact plate 15 is attached to the P-type layer 11 of each die 70 and tab 13 is connected to the N-type layer 12. Tab 13 is composed of from 0.1 to 15% gallium, 0.05% to 5% S, Se or Te (matching the N-type impurity of layer 12) and the remainder indium or tin. Both plate 15 and tab 13 are alloyed to the die 70. The lead wires 14 and 16 are then connected to the contacts 13 and 15, respectively, by alloying. In the event the diffused die 70 is used as an infrared detector cell, it is then mounted on plate 17 and sealed in the Dewar flask casing in the manner shown in FIGURES 2 and 3.

In order to more fully demonstrate the advantages of the infrared detector (produced in the manner described above) over prior art infrared detectors, reference will now be made to the quantity D*, a figure of merit used to describe infrared detectors. D* is a measure of the signal-to-noise ratio per unit of incident power normalized to a unit area and unit bandwidth, and is given by:

$$D^* = \frac{\frac{S}{N}\sqrt{A\Delta f}}{E_s A J_s}$$

where $J_s$=signal flux in photons/cm.$^2$/sec.,
$A$=cell area in cm.$^2$,
$E_s$=energy per photon of signal radiation,
$N$=detector noise,
$S$=signal strength, and
$\Delta f$=bandwidth.

Figure 5:
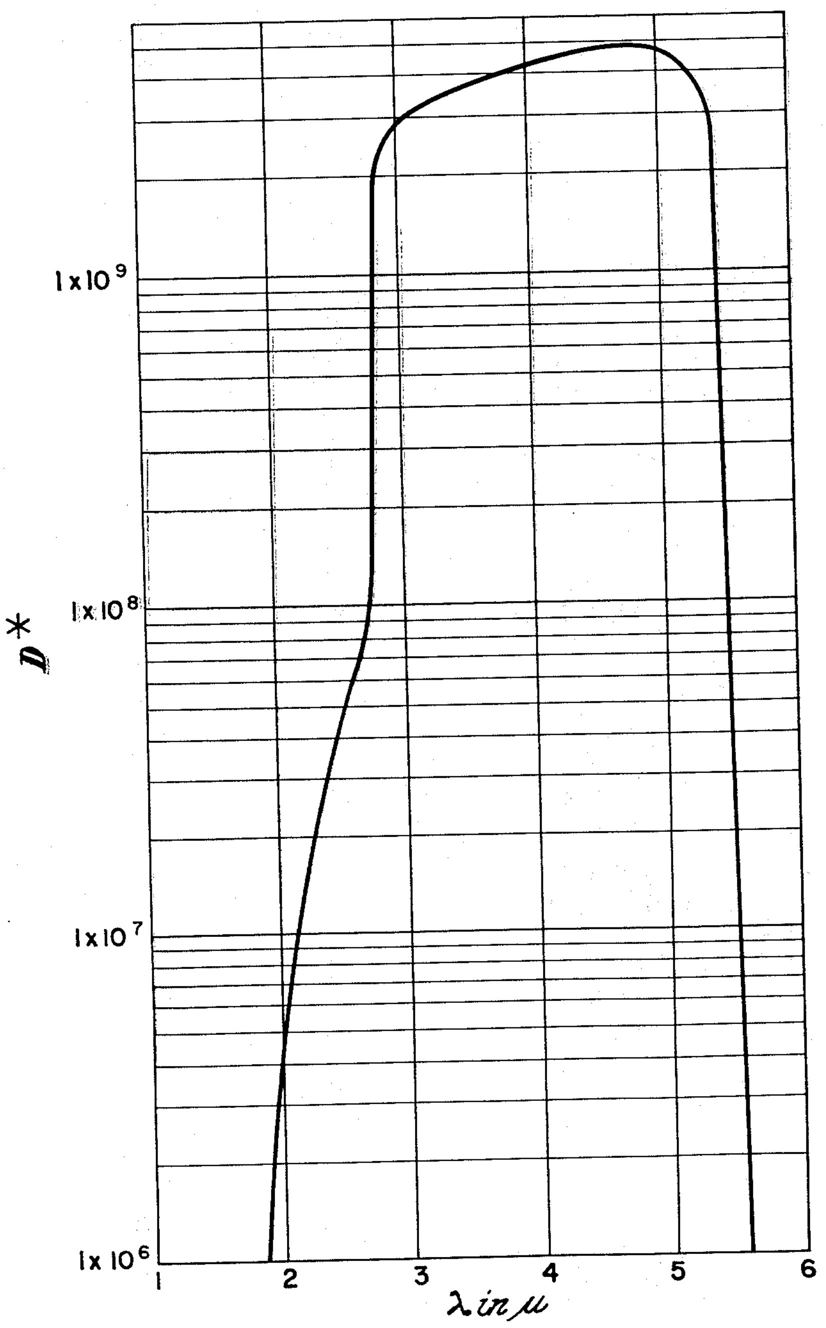
FIGURE 5 is a graph showing a typical spectral response curve of an infrared detector produced in accordance with the principles of the invention.

FIGURE 5 shows a plot of D* in cm.-(c.p.s.)$^{1/2}$-watts$^{-1}$ vs. the wavelength of the incident radiation in microns. This plot is for an infrared detector cell made from a wafer of 18 ohm-cm. P-type indium antimonide 30 mils thick, into which an N-type alloy comprising 50% tellurium, 5% gallium and 45% indium has been diffused. The diffusion operation was carried out at a temperature of 510° C. for 20 hours.

The values of D * obtained for the detector made from a wafer utilizing the fast-etched side to form the diffused PN junction is 10 times better than the value of D * if the slow-etched side of the wafer is used to form the PN junction in the wafer of the detector.

Referring to FIGURE 5, it should be noted that for wavelengths below 2.5 microns, very little energy is detected. Between 2.5 and 5.5 microns, a large amount of energy is detected. Above 5.5 microns hardly any energy is detected. In the wavelength range of less than 2 microns, it is believed that the energy goes undetected because of the presence of the sulfur, selenium or tellurium dope. The lack of energy detection above 5.5 micron value is believed to be caused by the energy being transmitted through the PN junction. It should also be pointed out that although the upper detection cut-off point is shown as occurring at around 5.5 microns in FIGURE 5, the upper cut-off point can be varied essentially between 4 and 5.5 microns. The bandwidth is varied by selection of impurities such as sulfur, selenium or tellurium and mixtures thereof. Sulfur gives a bandwidth of 1.5 microns whereas selenium provides a bandwidth between 1.5 to 2 microns and tellurium provides 2 to 3.5 to 4 micron bandwidth. Once the bandwidth is established, the threshold wavelength is varied between 2 to 3 microns by addition of gallium; thus the cut-off wavelength may be adjusted.

Thus, the infrared detector cell produced according to the principles of the present invention not only is characterized by an extremely high sensitivity and sharpness of bandwidth, but in addition, the cell itself provides an effective cooled filter for wavelengths in the 1 to 2.5 or 3.0 micron range. Moreover, the noise in this wavelength region is more effectively removed because the spectral response starts at the 2.5 or 3.0 micron region and ends between 4 and 5.5 microns. Note the extremely sharp upper cut-off of the infrared detector cell illustrated in FIGURE 5.

Although the invention has been shown and described with reference to particular embodiments, nevertheless, various changes and modifications obvious to those skilled in the art are deemed to be within the spirit, scope and contemplation of the invention as defined in the appended claims.

What is claimed is:

1. An infrared detector comprising a wafer of indium antimonide having a thicknes of about 30 mils and a resistivity of about 18 ohm-cm., said wafer having a P-type layer and having an N-type layer formed therein by diffusing an alloy of about 50% tellurium, about 5% gallium, and about 45% indium into said wafer of indium antimonide.

2. An infrared detector comprising a wafer of indium antimonide having a P-type layer and having an N-type layer formed therein by diffusing an alloy of indium, gallium, and an element selected from the group consisting of sulfur, selenium, and tellurium into said wafer of indium antimonide, a contact attached to said N-type layer comprising an alloy having the constituents 0.1 to 15% gallium, .05 to 5% of said element selected from the group consisting of sulfur, selenium, and tellurium, and the remainder one of indium and tin, and a lead connected to said P-type layer.

3. An infrared detector comprising a wafer of indium antimonide having a P-type layer and having an N-type layer formed therein by diffusing an alloy of indium, gallium, and an element selected from the group consisting of sulfur, selenium, and tellurium into said wafer of indium antimonide, a contact attached to said N-type layer comprising an alloy having the constituents 0.1 to 15% gallium, 0.05% to 5% of said element, and the remainder one of indium and tin, a gold-gallium wire connected to said contact, a tab of a material selected from the group consisting of indium and tin connected to said P-type layer, and a lead connected to said tab.

4. An infrared detector comprising a wafer of indium antimonide having a P-type layer and having an N-type layer formed therein by diffusing an alloy of indium, gallium, and an element selected from the group consisting of sulfur, selenium, and tellurium into said wafer of indium antimonide, a contact attached to said N-type layer comprising an alloy of gallium, indium and said element, a gold-gallium wire connected to said contact, a tab of a material selected from the group consisting of indium and tin connected to said P-type layer, a lead connected to said tab, a sealed two-piece glass casing with said wafer being mounted inside one of said glass pieces having a sapphire window at one end to admit infrared radiation, pins passing through and projecting out of said glass casing, said lead and said wire being attached to said pins, and means to establish a preselected pressure in the interior of said casing.

References Cited in the file of this patent

UNITED STATES PATENTS

| | | |
|---|---|---|
| 2,788,381 | Baldwin | Apr. 9, 1957 |
| 2,805,308 | Inman | Sept. 3, 1957 |
| 2,827,536 | Moore et al. | Mar. 18, 1958 |
| 2,846,340 | Jenny | Aug. 5, 1958 |
| 2,859,317 | Hersh | Nov. 4, 1958 |
| 2,942,331 | Smiley | June 28, 1960 |
| 2,951,944 | Fong | Sept. 6, 1960 |
| 2,977,262 | Carlson et al. | Mar. 28, 1961 |